Patented Sept. 13, 1932

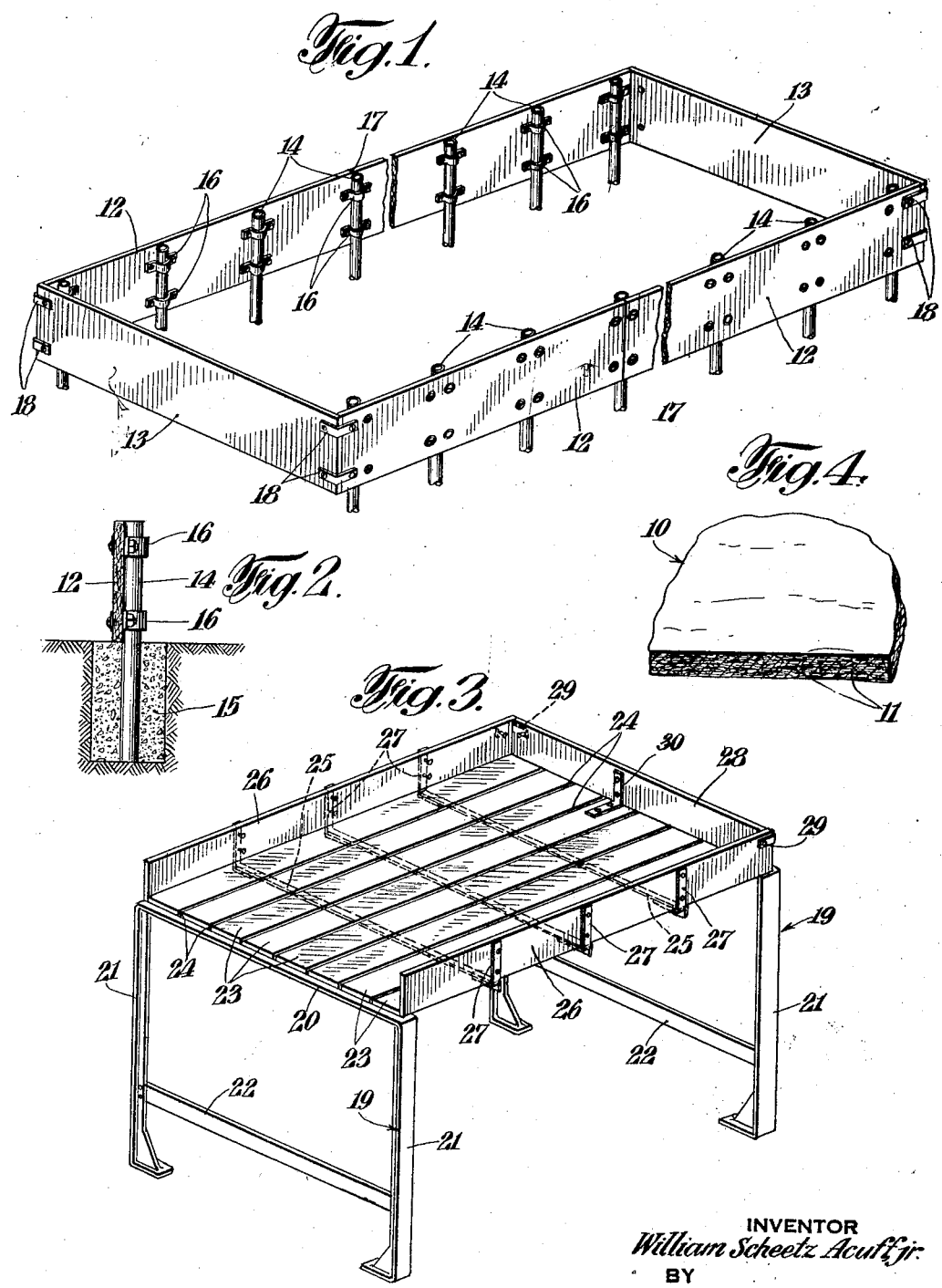

1,876,571

UNITED STATES PATENT OFFICE

WILLIAM SCHEETZ ACUFF, JR., OF AMBLER, PENNSYLVANIA, ASSIGNOR TO AMBLER ASBESTOS SHINGLE & SHEATHING COMPANY, OF AMBLER, PENNSYLVANIA, A CORPORATION OF PENNSYLVANIA

HOLDER FOR PLANT SOIL

Application filed November 22, 1929. Serial No. 408,944.

This invention relates to what are commonly termed greenhouse beds or benches, and has for its general object the provision of a new and improved support, holder or container for the soil used for the growing and propagation of plants.

Heretofore greenhouse work benches have been usually constructed either of wood or slate, the draw-back of slate being the expense involved not only for the slate itself but owing to its comparative heaviness the necessarily expensive supports required; while in the case of wood, the objections are rapid deterioration, the absence of sanitary qualities resulting in the growth of fungi, and the presence of vermin and plant lice.

I have discovered that asbestos material in the form of sheets, strips or boards makes a highly desirable material for use in greenhouse beds or benches, sides for hot and cold frames, tops of sorting tables, and in general wherever a supporting member or holder is required for soil and earth for greenhouses and like uses.

The asbestos material which I have found it preferable to use has a composition of substantially thirty percent asbestos fibers and seventy percent cement, producing by known process a homogeneous composition which, in the form of strips or boarding of a thickness in the neighborhood of one-half inch or less, is light and rigid and may be employed for the purposes stated at comparatively small expense.

This asbestos material is much lighter and less expensive than slate; it does not deteriorate, is subject to slight expense for up-keep, is fire-proof, sanitary, prevents fungus growth and the lodging and breeding of plant lice and vermin.

The accompanying drawing illustrates two constructions in which the asbestos material is employed, but it is to be understood that these are by way of illustration and that broadly considered the use of the asbestos material for the purposes stated is entirely new and is not to be restricted to any specific mounting or method of employment.

Fig. 1 is a perspective view of a greenhouse bed embodying one form of the invention;

Fig. 2 is a vertical sectional view illustrating a detail of the construction;

Fig. 3 is a perspective view of a greenhouse bench embodying another form of the invention; and Fig. 4 is an enlarged fragmentary perspective view of the asbestos material.

Referring to the drawing, the material for which I have discovered a new use and which for convenience is referred to herein as asbestos material, may be produced in sheet form by any known process, as for example the Hatschek process as set forth generally in Patent No. 12,594 (reissue). The preferable composition employs substantially thirty per cent asbestos fibers and seventy per cent cement, but of course the proportions may be varied within desirable limits. As produced, the sheet material 10 (Fig. 4) has the fibrous asbestos material 11 disposed or extended substantially longitudinally of the sheets and so incorporated with the cement as to promote rigidity.

The sheet material is preferably of a thickness of about three eighths of an inch, and may be cut into strips or boards of suitable length and width. In the greenhouse bed, holder or supporting member illustrated in Fig. 1, the side boards 12 are eight feet long and one foot wide or any width required, and the end boards 13 are three and one-half feet in length or any length required. The rectangular framing constituted by the side boards 12 and end boards 13 is preferably supported as shown in Figs. 1 and 2 by spaced piping elements 14, the piping being preferably one-half inch in diameter and of ordinary metallic construction. Each pipe or element 14 is bedded or seated and held in a concrete footing or pier 15 disposed in a suitable opening in the earth. The side boards 12 are disposed on the outer sides of the pipe element 14, the pipes being clamped to the inner faces of the side boards by clamps or straps 16 secured by suitable bolts and nuts. As many side boards may be employed as required in making a bed of desired length, and it will be noted from Fig. 1 that the joint indicated at 17 between two side boards 12 is covered at the inside by one of the pipe elements, the straps 16 which secure said element in place also providing a convenient means of securing the two side boards together. The end boards 13 are secured to the side boards by angle plates 18 which like the strip 16 are preferably of galvanized iron and are secured in place by suitable bolts and nuts.

In assembling the bed I have found it convenient first to bolt or clamp the pipe elements in place on the side boards by means of the straps as shown. Then, using a two-inch pipe, to drive holes in the ground selected, said holes being spaced in correspondence with the pipes 14 the two-inch pipe being withdrawn, the side boards are then put in place with their one-half inch pipe elements 14 in the holes which are then filled with cement to give a solid base or support. This procedure is carried out for the length of the bed after which the end pieces 13 are secured in place by means of the angle piece 18. In this construction the ground forms the bottom of the holder or support, which is adopted for greenhouse beds, hot and cold frames, and the like.

In the form of invention illustrated in Fig. 3, which is a bench of the sort convenient for use in greenhouses, metallic end frames 19 are provided, preferably of the rectangular shape shown, comprising a top cross bar 20, legs 21 and a lower cross bar 22, the end frames 19 are spaced apart, preferably at eight foot intervals, and where the frames are of steel their foot-pieces are bolted to concrete footings. It will be observed that the end pieces are constituted by a pair of metallic brackets of an inverted U-shape, and having preferably strengthening cross bars 22. The body portion of the bed is in box form open at the top and comprising a bottom, long sides and short sides or ends. The bottom or support is preferably made of boards or strips 23, eight feet long and six inches wide, suitably secured at their ends as by bolts and nuts to the cross bars 20, which are of angle iron, and spaced apart to leave openings or cracks indicated at 24 as outlets for water or moisture. If the bench is to exceed eight feet in length an additional end frame 19 is employed suitably spaced and the next set of bottom boards 23 are secured with their inner ends abutting the first set and supported on the angle bar 20 of the middle frame 19.

Spaced apart between the end frames and disposed at the under sides of the bottom boards 23 are a plurality of angle metallic cross bars 25, three being employed in the present instance, which are provided to stiffen the bottom and also to maintain the boards of which it is composed in proper relationship.

The side boards 26 are secured in upright position against the outside bottom boards as by metallic angle irons 27, the lower horizontal portions of which are secured to the cross bars 25. The end boards or strips 28 are secured to the side boards by angle plates or straps 29. Also preferably an angle strap 30 secures the middle portion of each end board 28 to the middle bottom board 23.

There is thus provided a bench, holder or supporting member which is adapted to receive earth or soil and to support any ordinary weight to which it will be subject in a green house, being capable of supporting approximately one hundred and twenty pounds per square foot; whereas the average weight to which a wooden bed is subjected is about fifty pounds per square foot. The bench it will be observed, comprises a unitary open-topped box-like body portion and a pair of independent end frames, the unitary body portion itself constituting the sole connection between the end frame and maintaining them in properly spaced relationship.

In filling the bench or removing the old earth it is convenient to place a plank down the middle of the bottom on which the man and wheel-barrow should remain during the filling or removal operation.

It will be understood that to employ the device as a sorting table it is only necessary to dispense with the side boards and end boards.

Various changes may be made without departing from the spirit and scope of my invention.

I claim:

1. A greenhouse bench comprising a unitary open-topped box-like body portion of asbestos material and a pair of independent upright metallic end frames on which the body portion is removably mounted, said unitary body portion being constituted by a bottom and sides and in itself constituting the sole connection between the end frames and maintaining them in properly spaced relationship.

2. A greenhouse bench comprising a rectangular body portion composed of boards of asbestos material, the bottom boards being secured to spaced metallic cross bars, the side boards being secured to the upright portions of metallic angle bars whose horizontal portions are secured to said cross bars, and the end boards being secured to the side boards, the whole constituting a unitary box-like structure; and a pair of spaced metallic end frames providing supports for said unitary structure, said untary structure in itself constituting the sole connection between said end frames and maintaining them in properly spaced relationship.

3. A greenhouse bench comprising a box-like body portion and a pair of metallic brackets of an inverted U-shape arranged at the ends of the body portion and on which the body portion is mounted, the bottom sides and ends of the body portion being composed of boards of asbestos and cement material, the bottom boards being spaced apart and secured to metallic cross bars angular in cross section and spaced apart lengthwise of the bench, angle bars to whose horizontal portions the said bars are secured, the horizontal portions of said angle bars being secured to the end portions of said cross bars, and angular metallic strips securing the end boards to the side boards.

WILLIAM SCHEETZ ACUFF, Jr.